(12) United States Patent
Rydnell et al.

(10) Patent No.: US 10,555,224 B2
(45) Date of Patent: Feb. 4, 2020

(54) NODE AND METHOD FOR HANDLING A MOBILITY PROCEDURE FOR A WIRELESS DEVICE

(71) Applicant: Telefonaktiebolaget LM Ericsson (publ), Stockholm (SE)

(72) Inventors: Gunnar Rydnell, Göteborg (SE); Stefan Karl Toth, Göteborg (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 15/745,229

(22) PCT Filed: Aug. 14, 2015

(86) PCT No.: PCT/EP2015/068794
§ 371 (c)(1),
(2) Date: Jan. 16, 2018

(87) PCT Pub. No.: WO2017/028886
PCT Pub. Date: Feb. 23, 2017

(65) Prior Publication Data
US 2019/0021029 A1    Jan. 17, 2019

(51) Int. Cl.
*H04W 36/00* (2009.01)
*H04W 12/04* (2009.01)
*H04L 29/06* (2006.01)

(52) U.S. Cl.
CPC ..... *H04W 36/0033* (2013.01); *H04L 63/0876* (2013.01); *H04W 12/04* (2013.01); *H04W 36/0022* (2013.01)

(58) Field of Classification Search
CPC .............. H04L 63/0876; H04W 12/04; H04W 36/0022; H04W 36/0033; H04W 60/04; H04W 8/04
See application file for complete search history.

(56) References Cited

U.S. PATENT DOCUMENTS

2014/0321412 A1* 10/2014 Zakrzewski ............ H04W 4/70
                                                           370/329

FOREIGN PATENT DOCUMENTS

| EP | 2442596 A1 * | 4/2012 | ............. H04W 8/02 |
| EP | 2442596 A1 | 4/2012 | |
| EP | 2592865 A1 | 5/2013 | |

OTHER PUBLICATIONS

Author Unknown, "Technical Specification Group Core Network and Terminals; Numbering, Addressing and Identification (Release 13)," Technical Specification 23.003, Version 13.2.0, 3GPP Organizational Partners, Jun. 2015, 93 pages.
(Continued)

*Primary Examiner* — Rina C Pancholi
(74) *Attorney, Agent, or Firm* — Withrow & Terranova, PLLC (57) ABSTRACT

Example embodiments presented herein are directed towards a stateless mobility management node, and corresponding methods therein, for handling a mobility procedure for a wireless device within a wireless communications network. The example embodiments provide for the management of a common external database shared by the stateless mobility management node and at least one other stateless mobility management node, and storing context information for wireless devices served by the stateless mobility management nodes. Such management allows for migrating the network towards a virtualized and stateless architecture. Thus, stateless mobility management nodes with an external database may interoperate with legacy stateful mobility management nodes.

14 Claims, 5 Drawing Sheets

(56) References Cited

OTHER PUBLICATIONS

Author Unknown, "Technical Specification Group Services and System Aspects; Network Sharing; Architecture and Functional Description (Release 13)," Technical Specification 23.251, Version 13.1.0, 3GPP Organizational Partners, Mar. 2015, 39 pages.
Author Unknown, "Technical Specification Group Services and System Aspects; General Packet Radio Service (GPRS) enhancements for Evolved Universal Terrestrial Radio Access Network (E-UTRAN) access (Release 13)," Technical Specification 23.401, Version 13.3.0, 3GPP Organizational Partners, Jun. 2015, 324 pages.
Author Unknown, "Technical Specification Group Services and System Aspects; Architecture enhancements to facilitate communications with packet data networks and applications (Release 13)," Technical Specification 23.682, Version 13.2.0, 3GPP Organizational Partners, Jun. 2015, 70 pages.
Author Unknown, "Technical Specification Group Radio Access Network; Evolved Universal Terrestrial Radio Access Network (E-UTRAN); S1 Application Protocol (S1AP) (Release 13)," Technical Specification 36.413, Version 13.0.0, 3GPP Organizational Partners, Jun. 2015, 302 pages.
International Search Report and Written Opinion for International Patent Application No. PCT/EP2015/068794, dated Apr. 12, 2016, 11 pages.

\* cited by examiner

NODE AND METHOD FOR HANDLING A MOBILITY PROCEDURE FOR A WIRELESS DEVICE

This application is a 35 U.S.C. § 371 national phase filing of International Application No. PCT/EP2015/068794, filed Aug. 14, 2015, the disclosure of which is incorporated herein by reference in its entirety.

TECHNICAL FIELD

Example embodiments presented herein are directed towards a stateless mobility management node, and corresponding methods therein, for handling a mobility procedure for a wireless device within a wireless communications network.

BACKGROUND

In a typical cellular system, also referred to as a wireless communications network, wireless terminals, also known as mobile stations and/or user equipment units communicate via a Radio Access Network (RAN) to one or more core networks. The wireless terminals can be Machine-to-Machine (M2M) devices, Internet-of-Things devices, mobile stations or user equipment units such as mobile telephones also known as "cellular" telephones, and laptops with wireless capability, for example, portable, pocket, hand-held, computer-comprised, or car-mounted mobile devices which communicate voice and/or data with radio access network.

The radio access network covers a geographical area which is divided into cell areas, with each cell area being served by a base station, e.g., a Radio Base Station (RBS), which in some networks is also called "NodeB" or "B node" or "Evolved NodeB" or "eNodeB" or "eNB" and which in this document also is referred to as a base station. A cell is a geographical area where radio coverage is provided by the radio base station equipment at a base station site. Each cell is identified by an identity within the local radio area, which is broadcast in the cell. The base stations communicate over the air interface operating on radio frequencies with the user equipment units within range of the base stations.

In some versions of the radio access network, several base stations are typically connected, e.g., by landlines or microwave, to a Radio Network Controller (RNC). The radio network controller, also sometimes termed a Base Station Controller (BSC), supervises and coordinates various activities of the plural base stations connected thereto. The radio network controllers are typically connected to one or more core networks.

The Universal Mobile Telecommunications System (UMTS) is a third generation mobile communication system, which evolved from the Global System for Mobile Communications (GSM), and is intended to provide improved mobile communication services based on Wideband Code Division Multiple Access (WCDMA) access technology. UMTS Terrestrial Radio Access Network (UTRAN) is essentially a radio access network using wideband code division multiple access for user equipment units (UEs). The Third Generation Partnership Project (3GPP) has undertaken to evolve further the UTRAN and GSM based radio access network technologies. Long Term Evolution (LTE) together with Evolved Packet Core (EPC) is the newest addition to the 3GPP family.

An example of a node in the core network is a mobility management node. Examples of a mobility management node are a Serving General Packet Radio Service Support Node (SGSN), a S4-SGSN and a Mobility Management Entity (MME). Such nodes are responsible, for example, for idle mode UE tracking and paging procedures including retransmissions. Mobility management nodes are also involved in bearer activation/deactivation and handover procedures. Mobility management nodes may be stateful or stateless. It is preferred that a stateful mobility management node serves the wireless device based on wireless device context information stored in the mobility management node itself. It is preferred that a stateless mobility management node serves the wireless device based on wireless device context information stored outside the mobility management node in a database that is used only by the specific mobility management node itself. Wireless device context information may e.g. include session states of the wireless device, e.g. such as values or flags or similar being set based one or more preceding events or similar relating to the wireless device. In addition, both stateful and stateless mobility management nodes may serve the wireless device based on other information than the wireless device context information, e.g. such as input parameters supplied to the mobility management for serving the wireless device.

In a stateless architecture, a mobility management node will save the wireless device context information, for example, UE context or similar, in an external database. For a migrating network, stateless mobility management nodes will exist together with legacy stateful mobility management nodes with an internal database holding the UE context. Some cells in the network may be served by legacy nodes while some cells may be served by parts of the core network which are upgraded to a virtualized implementation where states are saved in an external database.

SUMMARY

Due to the presence of both legacy and stateless mobility management nodes, a problem may arise in which stored UE context may not be updated. Specifically, in some cases the UE Context is stored in the UE and the UE Context saved in the network, for example, in the external data base, may be out of synch. Consider the case when a wireless device moves from a cell served by a stateless mobility management node, to a cell served by a legacy stateful mobility management node and then again to a cell served by a stateless mobility management node.

The first stateless mobility management node will store the wireless device context information in the external database, the second mobility management node, the legacy stateful node, will keep the wireless device context information in memory without updating the database. At this point the wireless device will store new context information and there will be a mismatch between the context in the wireless device compared to the wireless device context stored in the database. When eventually the wireless device moves into service of the third mobility management node, which may be another stateless mobility management node or possibly back to the first stateless mobility management node, the context stored in the wireless device and the context stored in the database will be out of synch. The third mobility management node, being stateless, when receiving a Tracking Area Update (TAU), would normally read the wireless device context from the database and proceed with the TAU procedure. This is not possible though in this case and there must be a procedure for re-synchronization of the wireless device and the database states.

As such, at least one objective of the example embodiments presented herein is how to provide a re-synchronization mechanism in a network utilizing both stateful and stateless mobility management nodes. An example advantage of the some of the example embodiments presented herein is the ability of migrating the EPC network towards a virtualized and stateless architecture. Thus, stateless mobility management nodes with an external database may interoperate with legacy stateful mobility management nodes.

Accordingly, some of the example embodiments are directed towards a stateless mobility management node for handling a mobility procedure for a wireless device within a wireless communications network. The stateless mobility management node comprises a processor and a memory. The memory comprises instructions executable by the processor whereby the stateless mobility management node is operative to perform the following operations. The stateless mobility management node is operative to receive, from the wireless device, a request for the mobility procedure. The request comprises an identification identifying at least one of the wireless device or a mobility management node currently serving the wireless device. The stateless mobility management node is also operative to access, based on the identification, an external database comprising stored context information for a plurality of wireless devices. The stateless mobility management node is further operative to determine current context information based on the an availability of stored context information for the wireless device and/or the stored context information itself for the wireless device. The stateless mobility management node is also operative to perform the requested mobility procedure using current context information. The stateless mobility management node is further operative to manage the external database such that the external database comprises updated current context information. The updated current context information comprises information related to the wireless device upon a completion of the mobility procedure.

Some of the example embodiments are directed towards a method, in a stateless mobility management node, for handling a mobility procedure for a wireless device within a wireless communications network. The method comprises receiving, from the wireless device, a request for the mobility procedure. The request comprises an identification identifying at least one of the wireless device or a mobility management node currently serving the wireless device. The method further comprises accessing, based on the identification, an external database comprising stored context information for a plurality of wireless devices. The method also comprises determining current context information based on an availability of stored context information for the wireless device and/or the stored context information itself for the wireless device. The method further comprises performing the requested mobility procedure using current context information. The method also comprises managing the external database such that the external database comprises the current context information. The updated current context information comprises information related to the wireless device upon a completion of the mobility procedure.

DEFINITIONS

| | |
|---|---|
| 3GPP | Third Generation Partnership Project |
| AS | Application Server |
| E-UTRAN | Evolved Universal Terrestrial Radio Access Network |
| eNodeB | Evolved NodeB |
| EPC | Evolved Packet Core |

DEFINITIONS -continued

| | |
|---|---|
| GERAN | GSM/EDGE Radio Access Network |
| GGSN | Gateway GPRS Support Node |
| GPRS | General Packet Radio Service |
| GSM | Global System for Mobile Communications |
| GUTI | Globally Unique Temporary Identity |
| HLR | Home Location Register |
| HSS | Home Subscriber Server |
| IMSI | International Mobile Subscriber Identity |
| IoT | Internet of Things |
| IP | Internet Protocol |
| LTE | Long Term Evolution |
| M2M | Machine-to-Machine |
| MME | Mobility Management Entity |
| PCRF | Policy Control and Charging Rules Function |
| PDN | Packet Data Network |
| PGW | PDN Gateway |
| P-TMSI | Packet Temporary Mobile Subscriber Identity |
| RAN | Radio Access Network |
| RAU | Routing Area Update |
| RBS | Radio Base Station |
| RNC | Radio Network Controller |
| RRC | Radio Resource Control |
| SCS | Service Capability Server |
| SGSN | Serving GPRS Support Node |
| SGW | Serving Gateway |
| TAU | Tracking Area Update |
| UE | User Equipment |
| UMTS | Universal Mobile Telecommunications System |
| UTRAN | UMTS Terrestrial Radio Access Network |

BRIEF DESCRIPTION OF THE DRAWINGS

The foregoing will be apparent from the following more particular description of the example embodiments, as illustrated in the accompanying drawings in which like reference characters refer to the same parts throughout the different views. The drawings are not necessarily to scale, emphasis instead being placed upon illustrating the example embodiments.

DETAILED DESCRIPTION

In the following description, for purposes of explanation and not limitation, specific details are set forth, such as particular components, elements, techniques, etc. in order to provide a thorough understanding of the example embodiments. However, it will be apparent to one skilled in the art that the example embodiments may be practiced in other manners that depart from these specific details. In other instances, detailed descriptions of well-known methods and elements are omitted so as not to obscure the description of the example embodiments. The terminology used herein is for the purpose of describing the example embodiments and is not intended to limit the embodiments presented herein. It should be appreciated that all of the example embodiments presented herein may be applicable to a GERAN, UTRAN or E-UTRAN based system. It should further be appreciated that the term wireless device, wireless terminal, M2M device, MTC device, IoT device and user equipment may be used interchangeably.

General Overview

The example embodiments presented herein are directed towards a stateless mobility management node for handling a mobility procedure for a wireless device in a communications network. The example embodiments provide a means of migrating the EPC network towards a virtualized and stateless architecture. Thus, stateless mobility management nodes with an external database for wireless device context information may interoperate with legacy stateful mobility management nodes with an internal database for wireless device context information. Example embodiments of the present solution makes use of a common external database shared by two or more stateless nodes for storing wireless device context information for wireless devices served by the nodes.

Wireless device context information may e.g. include session states of the wireless device, e.g. such as values or flags or similar being set based one or more preceding events or similar relating to the wireless device. Wireless device context information may e.g. include UE context or similar. For example, wireless device context information may correspond to one or more or preferably all the Fields such as IMSI etc. described in 3GPP TS 23.401 V13.3.0 (2015-06) Table 5.7.2-1, as shown below:

| Field | Description |
| --- | --- |
| IMSI | IMSI (International Mobile Subscriber Identity) is the subscribers permanent identity. |
| IMSI-unauthenticated-indicator | This is an IMSI indicator to show the IMSI is unauthenticated. |
| MSISDN | The basic MSISDN of the UE. The presence is dictated by its storage in the HSS. |
| MM State | Mobility management state ECM-IDLE, ECM-CONNECTED, EMM-DEREGISTERED. |
| GUTI | Globally Unique Temporary Identity. |
| ME Identity | Mobile Equipment Identity - (e.g. IMEI/IMEISV) Software Version Number |
| Tracking Area List | Current Tracking area list |
| TAI of last TAU | TAI of the TA in which the last Tracking Area Update was initiated. |
| E-UTRAN Cell Global Identity | Last known E-UTRAN cell |
| E-UTRAN Cell Identity Age | Time elapsed since the last E-UTRAN Cell Global Identity was acquired |
| CSG ID | Last known CSG ID when the UE was active |
| CSG membership | Last known CSG membership of the UE when the UE was active |
| Access mode | Access mode of last known ECGI when the UE was active |
| Authentication Vector | Temporary authentication and key agreement data that enables an MME to engage in AKA with a particular user. An EPS Authentication Vector consists of four elements: a) network challenge RAND, b) an expected response XRES, c) Key $K_{ASME}$, d) a network authentication token AUTN. |
| UE Radio Access Capability | UE radio access capabilities. |
| MS Classmark 2 | GERAN/UTRAN CS domain core network classmark (used if the MS supports SRVCC to GERAN or UTRAN) |
| MS Classmark 3 | GERAN CS domain radio network classmark (used if the MS supports SRVCC to GERAN) |
| Supported Codecs | List of codecs supported in the CS domain (used if the MS supports SRVCC to GERAN or UTRAN) |
| UE Network Capability | UE network capabilities including security algorithms and key derivation functions supported by the UE |
| MS Network Capability | For a GERAN and/or UTRAN capable UE, this contains information needed by the SGSN. |
| UE Specific DRX Parameters | UE specific DRX parameters for A/Gb mode, Iu mode and S1-mode |
| Selected NAS Algorithm | Selected NAS security algorithm |
| eKSI | Key Set Identifier for the main key $K_{ASME}$. Also indicates whether the UE is using security keys derived from UTRAN or E-UTRAN security association. |
| $K_{ASME}$ | Main key for E-UTRAN key hierarchy based on CK, IK and Serving network identity |
| NAS Keys and COUNT | $K_{NASint}$, $K_{NASenc}$, and NAS COUNT parameter. |
| Selected CN operator id | Selected core network operator identity (to support network sharing as defined in TS 23.251 [24]). |
| Recovery | Indicates if the HSS is performing database recovery. |
| Access Restriction | The access restriction subscription information. |
| ODB for PS parameters | Indicates that the status of the operator determined barring for packet oriented services. |
| APN-OI Replacement | Indicates the domain name to replace the APN-OI when constructing the PDN GW FQDN upon which to perform a DNS resolution. This replacement applies for all the APNs in the subscriber's profile. See TS 23.003 [9] clause 9.1.2 for more information on the format of domain names that are allowed in this field. |
| MME IP address for S11 | MME IP address for the S11 interface (used by S-GW) |
| MME TEID for S11 | MME Tunnel Endpoint Identifier for S11 interface. |
| S-GW IP address for S11/S4 | S-GW IP address for the S11 and S4 interfaces |

-continued

| Field | Description |
| --- | --- |
| S-GW TEID for S11/S4 | S-GW Tunnel Endpoint Identifier for the S11 and S4 interfaces. |
| SGSN IP address for S3 | SGSN IP address for the S3 interface (used if ISR is activated for the GERAN and/or UTRAN capable UE) |
| SGSN TEID for S3 | SGSN Tunnel Endpoint Identifier for S3 interface (used if ISR is activated for the E-UTRAN capable UE) |
| eNodeB Address in Use for S1-MME | The IP address of the eNodeB currently used for S1-MME. |
| eNB UE S1AP ID | Unique identity of the UE within eNodeB. |
| MME UE S1AP ID | Unique identity of the UE within MME. |
| Subscribed UE-AMBR | The Maximum Aggregated uplink and downlink MBR values to be shared across all Non-GBR bearers according to the subscription of the user. |
| UE-AMBR | The currently used Maximum Aggregated uplink and downlink MBR values to be shared across all Non-GBR bearers. |
| EPS Subscribed Charging Characteristics | The charging characteristics for the UE e.g. normal, prepaid, flat rate and/or hot billing. |
| Subscribed RFSP Index | An index to specific RRM configuration in the E-UTRAN that is received from the HSS. |
| RFSP Index in Use | An index to specific RRM configuration in the E-UTRAN that is currently in use. |
| Trace reference | Identifies a record or a collection of records for a particular trace. |
| Trace type | Indicates the type of trace |
| Trigger id | Identifies the entity that initiated the trace |
| OMC identity | Identifies the OMC that shall receive the trace record(s). |
| URRP-MME | URRP-MME indicating that the HSS has requested the MME to notify the HSS regarding UE reachability at the MME |
| DL Data Buffer Expiration Time | When extended buffering of DL data has been invoked for UEs that uses power saving functions e.g. PSM, this time is when the buffer will expire in the Serving GW. |
| Suggested number of buffered downlink packets | Suggested number of buffered downlink packets at extended buffering. This is an optional parameter. |
| CSG Subscription Data | The CSG Subscription Data is associated lists of CSG IDs for the visiting PLMN and the equivalent PLMNs fo the visitng PLMN, and for each CSG ID optionally an associated expiration date which indicates the point in time when the subscription to the CSG ID expires; an absent expiration date indicates unlimited subscription. For a CSG ID that can be used to access specific PDNs via Local IP Access, the CSG ID entry includes the corresponding APN(s). |
| LIPA Allowed | Specifies whether the UE is allowed to use LIPA in this PLMN. |
| Subscribed Periodic RAU/TAU Timer | Indicates a subscribed Periodic RAU/TAU Timer value. |
| MPS CS priority | Indicates that the UE is subscribed to the eMLPP or 1x RTT priority service in the CS domain. |
| MPS EPS priority | Indicates that the UE is subscribed to MPS in the EPS domain. |
| Voice Support Match Indicator | An indication whether the UE radio capabilities are compatible with the network configuration (e.g. whether the SRVCC and frequency support by the UE matches those that the network relies upon for voice coverage). The MME uses it as an input for setting the IMS voice over PS Session Supported Indication. |
| Homogenous Support of IMS Voice over PS Sessions | Indicates per UE if "IMS Voice over PS Sessions" is homogeneously supported in all TAs in the serving MME or homogeneously not supported, or, support is non-homogeneous/unknown, see clause 4.3.5.8A. |
| UE Radio Capability for Paging Information | Information used by the eNB to enhance the paging towards the UE (see clause 5.11.4). The UE Radio Capability for Paging Information is defined in TS 36.413 [36]. |
| UE Usage Type | Indicates the usage characteristics of the UE for use with Dedicated Core Networks (see clause 4.3.25). |
| Group ID-list | List of the subscribed group(s) that the UE belongs to |
| Monitoring Event Information Data | Describes the monitoring event configuration information. See TS 23.682 [74] for more information. |
| | For each active PDN connection: |
| APN in Use | The APN currently used. This APN shall be composed of the APN Network Identifier and the default APN Operator Identifier, as specified in TS 23.003 [9], clause 9.1.2. Any received value in the APN OI Replacement field is not applied here. |
| APN Restriction | Denotes the restriction on the combination of types of APN for the APN associated with this EPS bearer Context. |
| APN Subscribed | The subscribed APN received from the HSS. |
| PDN Type | IPv4, IPv6 or IPv4v6 |
| IP Address(es) | IPv4 address and/or IPv6 prefix<br>NOTE: The MME might not have information on the allocated IPv4 address. Alternatively, following mobility involving a pre-release 8 SGSN, this IPv4 address might not be the one allocated to the UE. |

-continued

| Field | Description |
|---|---|
| EPS PDN Charging Characteristics | The charging characteristics of this PDN connection, e.g. normal, prepaid, flat-rate and/or hot billing. |
| APN-OI Replacement | APN level APN-OI Replacement which has same role as UE level APN-OI Replacement but with higher priority than UE level APN-OI Replacement. This is an optional parameter. When available, it shall be used to construct the PDN GW FQDN instead of UE level APN-OI Replacement. |
| SIPTO permissions | Indicates whether the traffic associated with this APN is prohibited for SIPTO, allowed for SIPTO excluding SIPTO at the local network, allowed for SIPTO including SIPTO at the local network or allowed for SIPTO at the local network only. |
| Local Home Network ID | If SIPTO@LN is enabled for this PDN connection it indicates the identity of the Local Home Network to which the (H)eNB belongs. |
| LIPA permissions | Indicates whether the PDN can be accessed via Local IP Access. Possible values are: LIPA-prohibited, LIPA-only and LIPA-conditional. |
| WLAN offloadability | Indicates whether the traffic associated with this PDN Connection is allowed to be offloaded to WLAN using the WLAN/3GPP Radio Interworking feature or if it shall be kept on 3GPP access (see clause 4.3.23). The indication may contain separate values per RAT (E-UTRA and UTRA). |
| VPLMN Address Allowed | Specifies whether the UE is allowed to use the APN in the domain of the HPLMN only, or additionally the APN in the domain of the VPLMN. |
| PDN GW Address in Use (control plane) | The IP address of the PDN GW currently used for sending control plane signalling. |
| PDN GW TEID for S5/S8 (control plane) | PDN GW Tunnel Endpoint Identifier for the S5/S8 interface for the control plane. (For GTP-based S5/S8 only). |
| MS Info Change Reporting Action | Need to communicate change in User Location Information to the PDN GW with this EPS bearer Context. |
| CSG Information Reporting Action | Need to communicate change in User CSG Information to the PDN GW with this EPS bearer Context. This field denotes separately whether the MME/SGSN are requested to send changes in User CSG Information for (a) CSG cells, (b) hybrid cells in which the subscriber is a CSG member and (c) hybrid cells in which the subscriber is not a CSG member. |
| Presence Reporting Area Action | Need to communicate a change of UE presence in Presence Reporting Area. This field denotes separately the Presence Reporting Area identifier, and the list of Presence Reporting Area elements (if provided by the PDN GW). |
| EPS subscribed QoS profile | The bearer level QoS parameter values for that APN's default bearer (QCI and ARP) (see clause 4.7.3). |
| Subscribed APN-AMBR | The Maximum Aggregated uplink and downlink MBR values to be shared across all Non-GBR bearers, which are established for this APN, according to the subscription of the user. |
| APN-AMBR | The Maximum Aggregated uplink and downlink MBR values to be shared across all Non-GBR bearers, which are established for this APN, as decided by the PDN GW. |
| PDN GW GRE Key for uplink traffic (user plane) | PDN GW assigned GRE Key for the S5/S8 interface for the user plane for uplink traffic. (For PMIP-based S5/S8 only) |
| Default bearer | Identifies the EPS Bearer Id of the default bearer within the given PDN connection. |
| low access priority | Indicates that the UE requested low access priority when the PDN connection was opened. NOTE: The low access priority indicator is only stored for the purpose to be included in charging records. |
| Communication Patterns | Indicates per UE the Communication Patterns and their corresponding validity times as specified in TS 23.682 [74]. The Communication Patterns are not provided to the SGSN. |
| For each bearer within the PDN connection: | |
| EPS Bearer ID | An EPS bearer identity uniquely identifies an EP S bearer for one UE accessing via E-UTRAN |
| TI | Transaction Identifier |
| S-GW IP address for S1-u | IP address of the S-GW for the S1-u interfaces. |
| S-GW TEID for S1u | Tunnel Endpoint Identifier of the S-GW for the S1-u interface. |
| PDN GW TEID for S5/S8 (user plane) | P-GW Tunnel Endpoint Identifier for the S5/S8 interface for the user plane. (Used for S-GW change only). NOTE: The PDN GW TEID is needed in MME context as S-GW relocation is triggered without interaction with the source S-GW, e.g. when a TAU occurs. The Target S-GW requires this Information Element, so it must be stored by the MME. |

-continued

| Field | Description |
|---|---|
| PDN GW IP address for S5/S8 (user plane) | P GW IP address for user plane for the S5/S8 interface for the user plane. (Used for S-GW change only). NOTE: The PDN GW IP address for user plane is needed in MME context as S-GW relocation is triggered without interaction with the source S-GW, e.g. when a TAU occurs. The Target S GW requires this Information Element, so it must be stored by the MME. |
| EPS bearer QoS | QCI and ARP optionally: GBR and MBR for GBR bearer |
| TFT | Traffic Flow Template. (For PMIP-based S5/S8 only) |

The Fields in 3GPP TS 23.401 V13.3.0 (2015-06) Table 5.7.2-1 are all well known to a person skilled in the art and the Fields need no detailed description as such.

Figure 1:
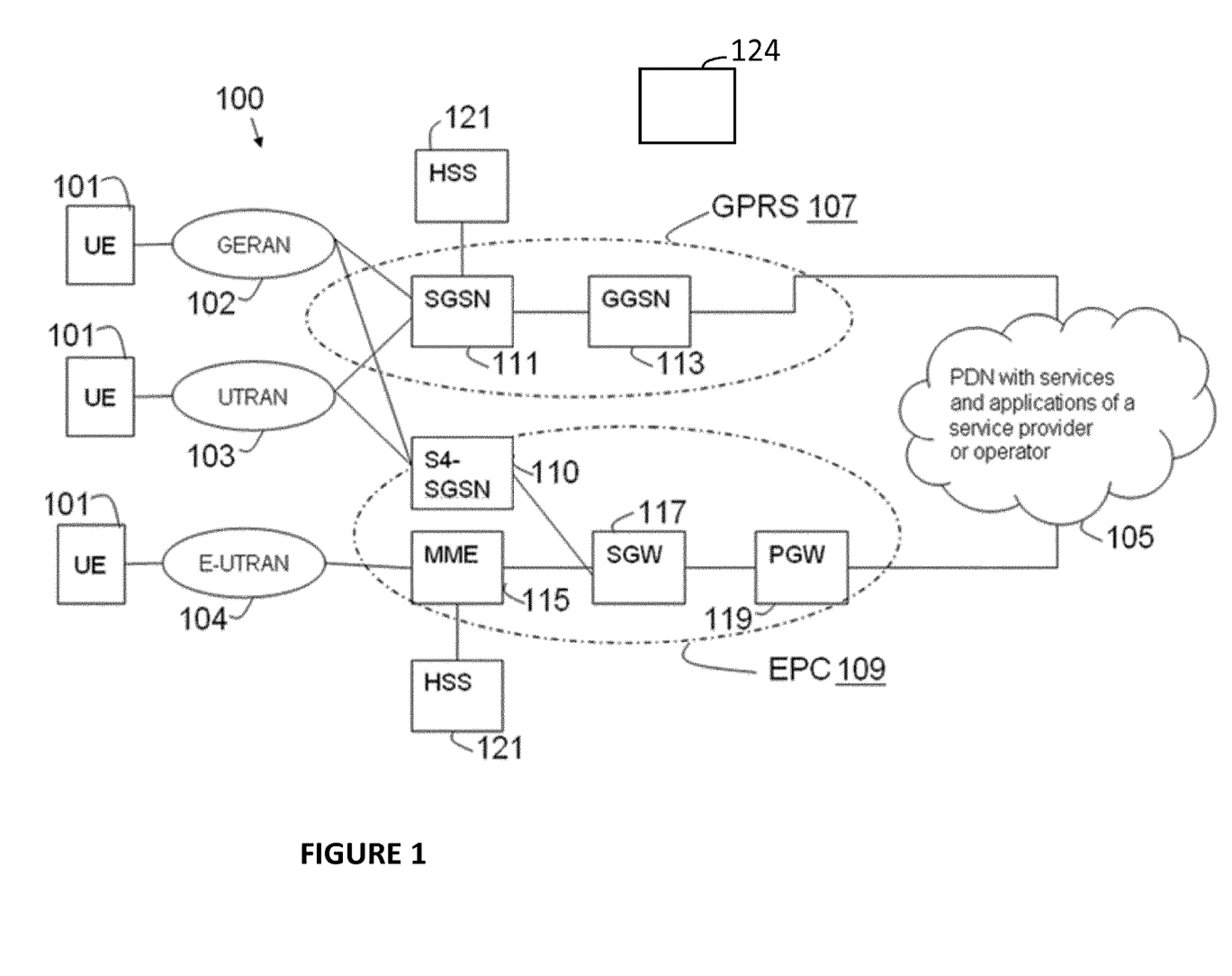
FIG. 1 is an illustrative example of a wireless network.

In order to provide a better explanation of the example embodiments presented herein, a problem will first be identified and discussed. FIG. 1 provides an example of a communication network 100. As shown in FIG. 1, a user equipment (UE) 101 may be in communication with a RAN in the form of a Universal Terrestrial Radio Access Network (UTRAN) 103, an Evolved UTRAN (E-UTRAN) 104, or a GSM Edge Radio Access Network (GERAN) 102 subsystem in order to access communication to an operator or application server 105. In gaining access to a Service Capability Server (SCS), Application Server (AS) or hosts 105, the UTRAN/E-UTRAN/GERAN subsystem 102-104 may be in communication with a core network in the form of a General Packet Radio Service (GPRS) subsystem 107 or an Evolved Packet Core (EPC) subsystem 109. It should also be appreciated that the network may further comprise a WiFi subsystem, although not illustrated in FIG. 1.

The GPRS subsystem 107 may comprise a core network function in the form of a Serving GPRS Support Node (SGSN) also known as Gn/Gp-SGSN 111, which may be responsible for the delivery of data packets to and from the mobile stations and/or UEs within an associated geographical service area. The SGSN 111 may also be responsible for packet routing, transfer, mobility management and connectivity management. The GPRS subsystem 107 may also include a core network function in the form of a Gateway GPRS Support Node (GGSN) 113, which may be responsible for the interworking between the GPRS subsystem 107 and the PDN 105.

The EPC subsystem 109 may comprise a core network function in the form of a Mobility Management Entity 115, which may be responsible for mobility management, connectivity management, idle mode UE tracking, paging procedures, attachment and activation procedures, and small data and message transfer towards the E-UTRAN 104. The EPC subsystem may also comprise a core network function in the form of a Serving Gateway (SGW) 117, which may be responsible for the routing and forwarding of data packets. The EPC subsystem may also include a core network function in the form of a Packet data network Gateway (PGW) 119, which may be responsible for providing connectivity from the user equipment 101 to one or more PDN(s) 105. Both the SGSN 111, the S4-SGSN 110 and the MME 115 may be in communication with a core network function in the form of a Home Subscriber Server (HSS) 121, which may provide device identification information, an International Mobile Subscriber Identity (IMSI), subscription information, etc. It should be appreciated that the EPC subsystem 109 may also comprise a S4-SGSN 110, thereby allowing the GERAN 102 or UTRAN 103 subsystems to be accessed when the GPRS 107 is replaced by the EPC 109.

The mobility management nodes or functions, for example, the MME, SGSN and S4-SGSN, may be stateless or stateful. A stateful node or function, also known herein as a legacy device, comprises an internal database for wireless device context information. Thus, the memory or database of a stateful node or function is interconnected to the mobility management node's or function's control logic. In contrast, a stateless node or function (e.g. a mobility management node or function) according to example embodiments of the present solution makes use of a common external database 124 shared by two or more stateless nodes for storing wireless device context information for wireless devices served by the nodes. Thus, the common memory or database of a stateless node or function is separate from the node's or function's control logic. It should be appreciated that the common external database 124 may be located anywhere within the wireless network. In the example provided in FIG. 1, the common external database 124 is illustrated as a stand-alone node.

Before proceeding it should be emphasised that the expressions node and function are used interchangeably herein, e.g. meaning that one or more functions may be implemented in a single node and that one node may comprise one or several functions. For example, some embodiments may have the GGSN, PGW, SGW, MME, SGSN and S4-SGSN functions implemented in separate nodes, while other embodiments may have one or more of the GGSN, PGW, SGW, MME, SGSN and S4-SGSN functions implemented in the same node or even have all these functions implemented in a single node.

Overview of the Example Embodiments

Due to the presence of both legacy stateful and more recent stateless mobility management nodes, a problem may arise in which stored UE context may not be updated. Specifically, in some cases the UE Context is stored in the wireless device and the UE Context saved in the network, for example, in the external data base, may be out of synch.

As such, at least one objective of the example embodiments presented herein is how to provide a re-synchronization mechanism in a network utilizing both stateful and stateless mobility management nodes. An example advantage of some of the example embodiments presented herein is the ability of migrating the EPC network towards a virtualized and stateless architecture. Thus, stateless mobility management nodes with an external database may interoperate with legacy stateful mobility management nodes.

Figure 2:
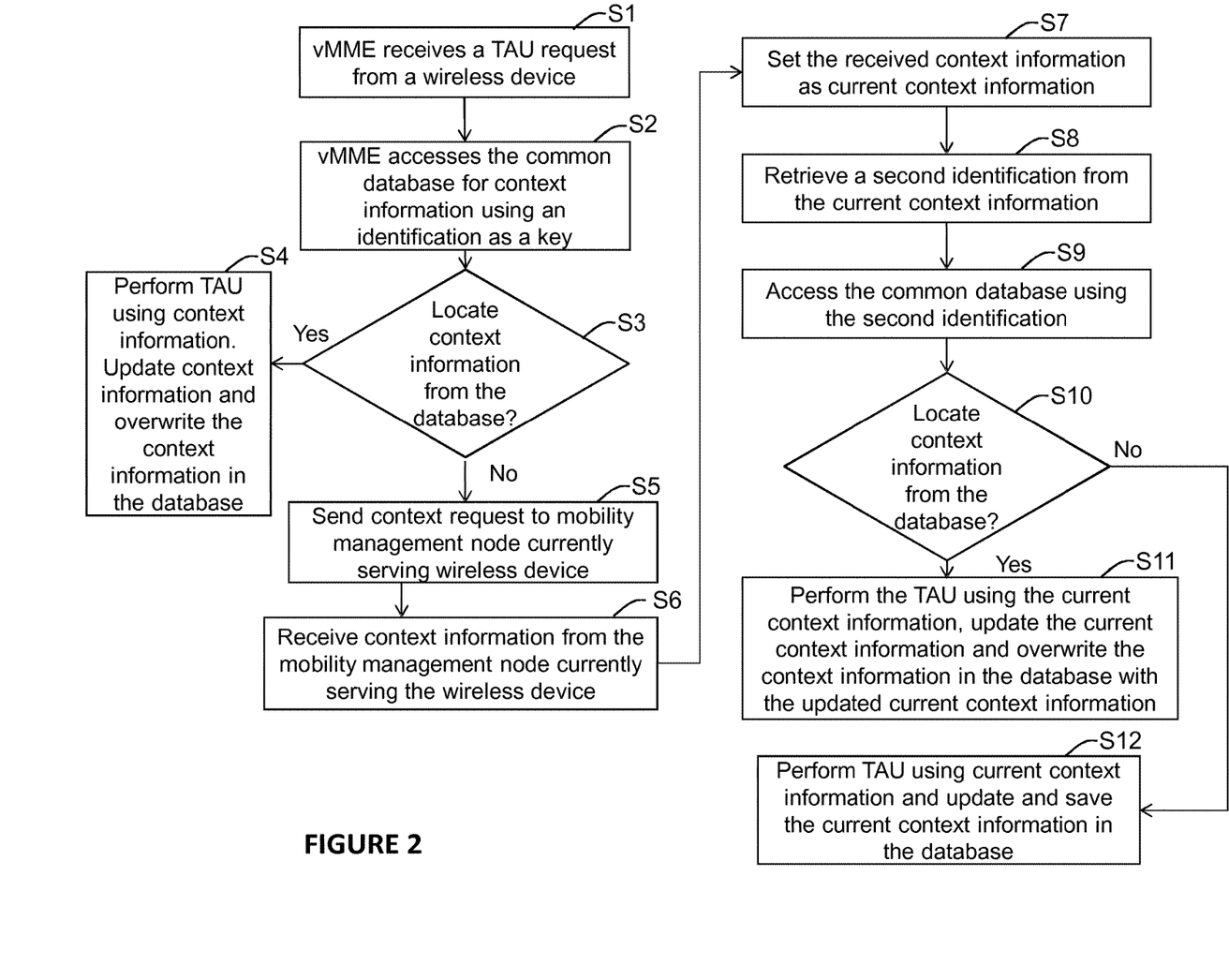
FIG. 2 is flow diagram depicting the handling of a mobility procedure, according to some of the example embodiments presented herein.

FIG. 2 illustrates a flow diagram providing an overview of mobility procedure handling as performed by a stateless mobility management node, according to some of the example embodiments presented herein. In the specific example provided by FIG. 2, the stateless mobility management node is a virtual Mobility Management Entity (vMME). When the wireless device moves from a "legacy cell" to a new "stateless cell", the wireless device sends a mobility request, for example, a Tracking Area Update (TAU) Request, which is routed towards a stateless mobility management node (S1). According to some of the example embodiments, the mobility request may also be a Routing Area Update (RAU) or a handover procedure. According to some of the example embodiments, the TAU request may be comprised in the handover procedure.

The stateless mobility management node will try to read/access the state/context information, for example, UE context information, from the common external database (S2). It should be appreciated that while the example embodiments may be described with the use of context information as an example, other context information may also be utilized. Identification for example, a Globally Unique Temporary Identity (GUTI) or a Packet Temporary Mobile Subscriber Identity (P-TMSI), will be used by the wireless device to identify itself with respect to the common database. Normally this identifier would be used as a key towards the database to find the context information. Thereafter, an evaluation is made as to whether or not context information for the wireless device associated with the received mobility request is located within the common external database (S3).

If the wireless device was ever at one point served by a stateless mobility management node, an entry in the external database will have an entry for the wireless device. If such an entry is found using the identification as a key, the wireless device was most recently served by a stateless mobility management node, for example, prior to the execution of the currently requested mobility request. In such an instance, the context information is retrieved from the common external database 124. The stateless mobility management node which received the request may thereafter updates the context information and overwrites the context information in the external database upon the completion of the mobility procedure (S4).

If the identification, for example, the GUTI or P-TMSI, associated the wireless device at this point was allocated by a legacy mobility management node, and not saved to the external database, this identification is useless as a key to the context information in the external database. The stateless mobility management node will call the database with this identification, but will get a reply that the context is not found. Thus, the context information is not found in the external database by using the identification as a key. At this point the stateless mobility management node has to fall back to legacy behavior and requests the context information from the old legacy mobility management node, or the mobility management node currently serving the wireless device, prior to the execution of the requested mobility procedure (S5). The old mobility management node is found from information in the identification, for example the GUTI or P-TMSI. According to some of the example embodiments, the stateless mobility management node sends the GTP message "UE Context request" to the legacy stateful mobility management node. The old legacy mobility management node will have the current context information stored in memory, and send it to the requesting stateless mobility management node in the UE Context response message.

Thereafter, the new stateless mobility management node receives the context information from the old stateful mobility management node, or the mobility management node currently serving the wireless device (S6). The stateless mobility management node may then set the received context information as current context information (S7). The stateless mobility management node may further extract a second identification, for example, the IMSI, from the received current context information (S8). Using the second identification as a key to the common external database, the stateless mobility management node can now access the common external database and try to locate context information associated with the wireless device from the database using the second identification (S9). Thereafter, an evaluation is made as to whether or not the stateless mobility management node is able to locate the context information from common external database (S10).

If the stateless mobility management node was able to locate the context information from the database, using the second identification, it now has two sets of context information for the wireless device, the one received from the old stateful mobility management node and one received from the common external database. If these two context information records do not include the same number of state attributes (UE parameters), it is preferred that the stateless mobility management node have an algorithm configured to create current context information to be used throughout the processing of the current mobility procedure. It should be appreciated that there may be additional parameters in the database record, for example, including temporary context information and/or parameters indicating "type of procedure in progress". Thus, the current context information is provided such that any additional attributes or parameters are taken into account. Using the current context information, the stateless mobility management node performs the mobility procedure (S11).

The stateless mobility management node thereafter updates the current context information to take into account any changes in the context information that may have occurred as a result of the performed mobility procedure (S11). For example, the GUTI is updated such that the wireless device and the network uses the same newly allocated GUTI. Upon updating, the stateless mobility management node overwrites the context information saved in the common external database with the updated current context information (S11).

If the context information is not located in the common external database (S10), the stateless mobility management node will perform the mobility procedure, the TAU procedure in the example provided in FIG. 2, with the context information provided by the mobility management node currently serving the wireless device, as explained in step 6. When the current TAU procedure is finished, the stateless mobility management node updates the current context information and saves the updated current context information to the external database (S12). The stateless mobility management node may delete the context information from the internal memory, for example, the stateless mobility management node acts as a pure stateless control logic or potentially in some deployments keeps the context information in a local cache.

It should be appreciated that the database can use at least the GUTI and the IMSI as keys to the context information. Then an algorithm may be employed in the new stateless mobility management node for making a mixed network of virtualized stateless mobility management nodes and stateful legacy nodes able to interoperate.

Example Node Configuration

Figure 3:
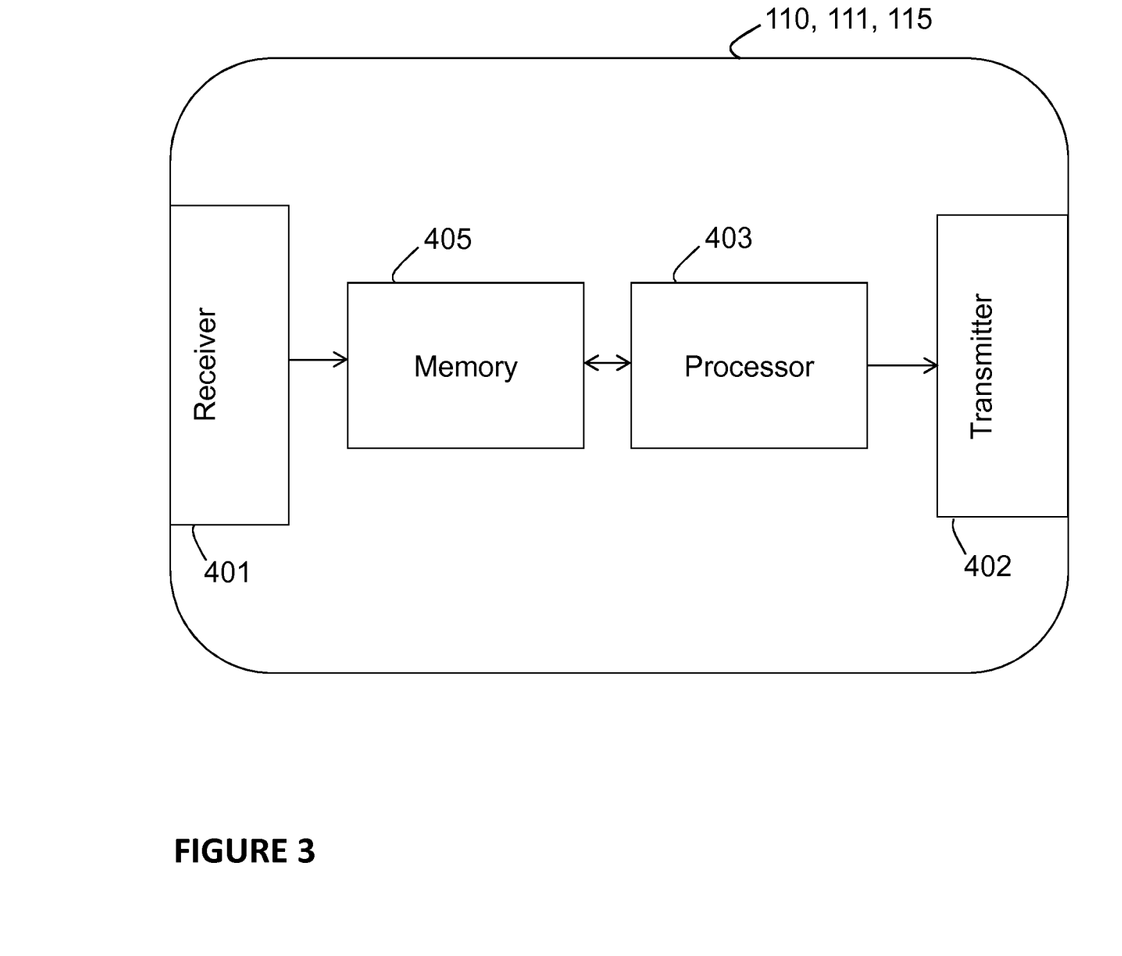
FIG. 3 is an example node configuration of a stateless mobility management node, according to some of the example embodiments.

FIG. 3 illustrates an example node configuration of a stateless mobility management node. It should be appreciated that a stateless mobility management node may be a MME, Gn/Gp-SGSN, or S4-SGSN. The stateless mobility management node may assist in the handling of a mobility procedure for a wireless device according to the example embodiments described herein. The stateless mobility management node may comprise a receiver 401 that may be configured to receive communication data, instructions, and/or messages. The stateless mobility management node may also comprise a transmitter 402 that may be configured to transmit communication data, instructions and/or messages. It should be appreciated that the receiver 401 and transmitter 402 may be comprised as any number of transceiving, receiving, and/or transmitting units, modules or circuitry. It should further be appreciated that the receiver 401 and transmitter 402 may be in the form of any input or output communications port known in the art. The receiver 401 and transmitter 402 may comprise RF circuitry and baseband processing circuitry (not shown).

The stateless mobility management node may also comprise a processing unit or circuitry 403 which may be configured to process information related to a mobility procedure as described herein. The processing circuitry 403 may be any suitable type of computation unit, for example, a microprocessor, digital signal processor (DSP), field programmable gate array (FPGA), or application specific integrated circuit (ASIC), or any other form of circuitry or module. The stateless mobility management node may further comprise a memory unit or circuitry 405 which may be any suitable type of computer readable memory and may be of volatile and/or non-volatile type. The memory 405 may be configured to store received, transmitted, and/or measured data, device parameters, communication priorities, and/or executable program instructions.

Example Node Operations

Figure 4:
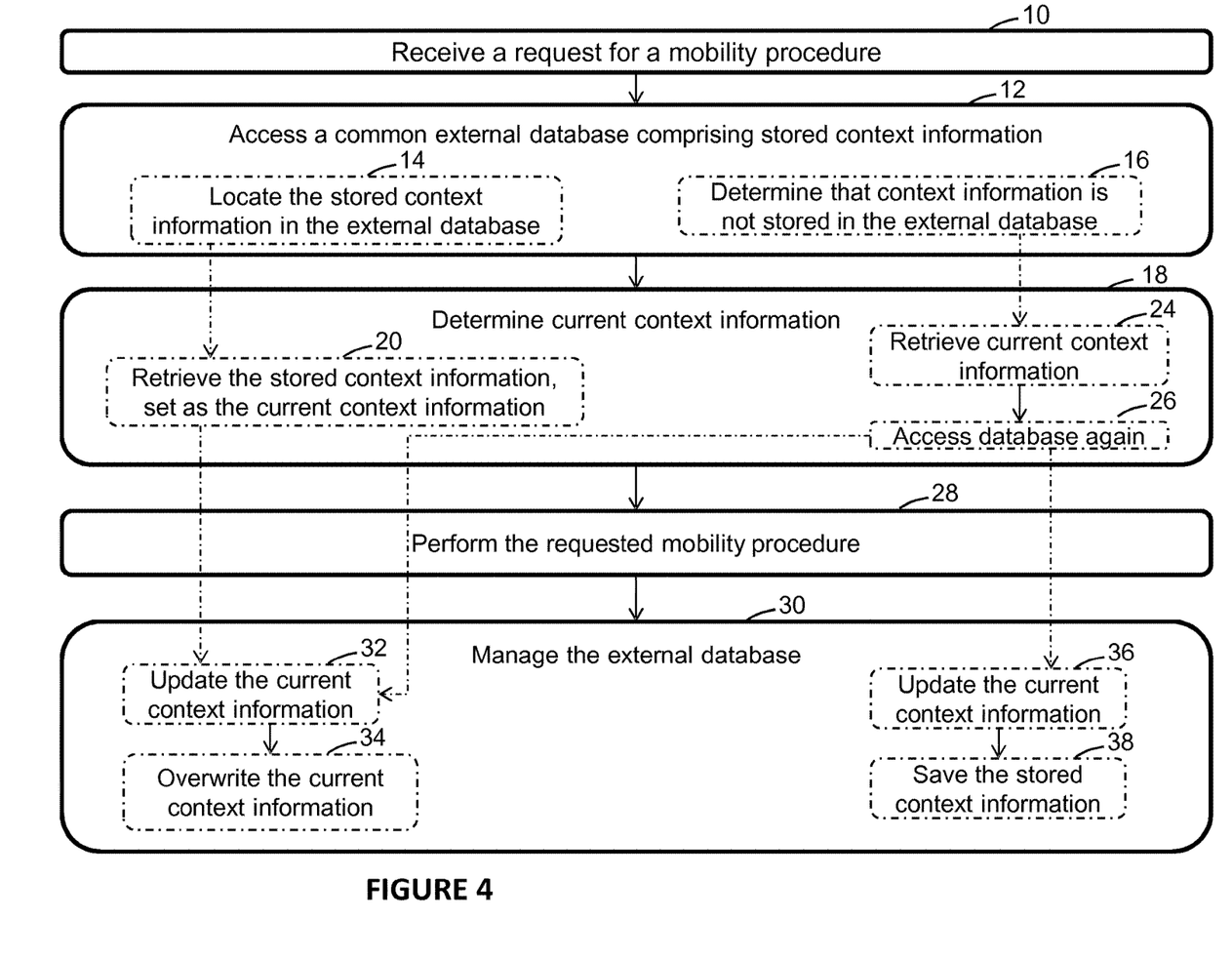
FIG. 4 is a flow diagram depicting example operations performed by the stateless mobility management node of FIG. 3, according to some of the example embodiments.

FIG. 4 is a flow diagram depicting example operations which may be taken by the stateless mobility management node for handling a mobility procedure for a wireless device as described herein. It should also be appreciated that FIG. 4 comprises some operations which are illustrated with a solid border and some operations which are illustrated with a dashed border. The operations which are comprised in a solid border are operations which are comprised in the broadest example embodiment. The operations which are comprised in a dashed border are example embodiments which may be comprised in, or a part of, or are further operations which may be taken in addition to the operations of the broader example embodiments. It should be appreciated that these operations need not be performed in order. Furthermore, it should be appreciated that not all of the operations need to be performed. The example operations may be performed in any order and in any combination. The example operations are further described in at least the non-limiting summary of example embodiments.

Figure 5:
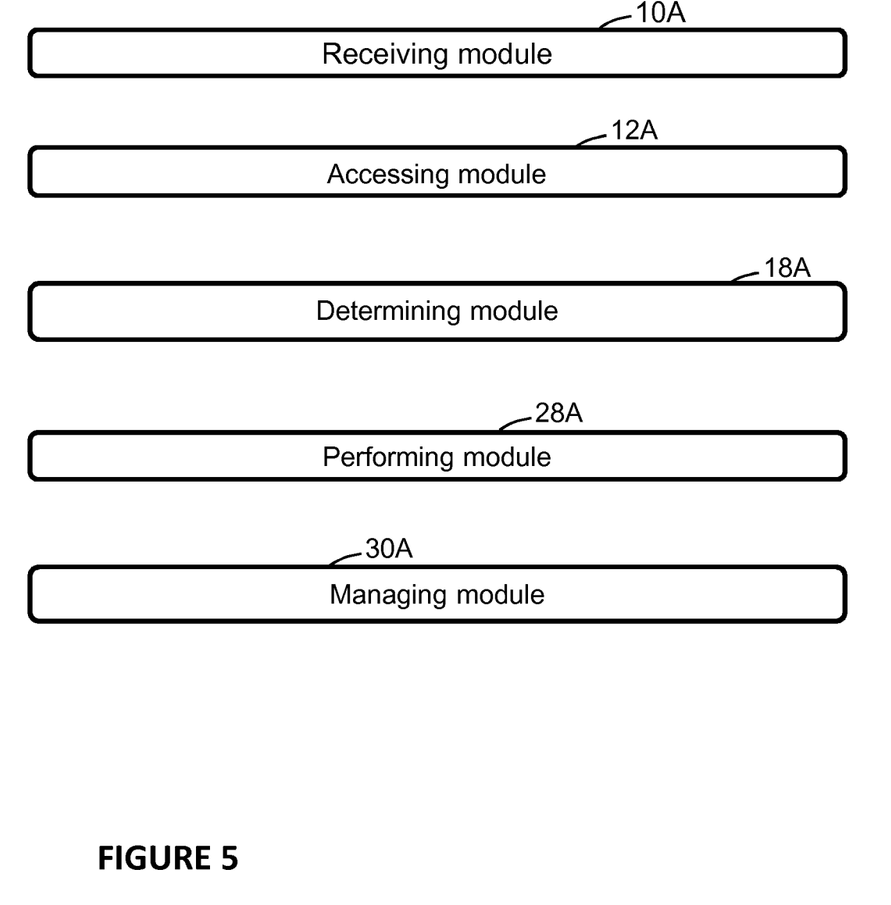
FIG. 5 is a module diagram of the stateless mobility management node of FIG. 4, according to some of the example embodiments.

FIG. 5 is a module diagram depicting modules which may perform at least some of the operations of FIG. 4.

Operation 10

The stateless mobility management node is configured to receive 10, from the wireless device, a mobility request for the mobility procedure. The request comprises an identification of the wireless device and/or a mobility management node currently serving the wireless device. The receiving 10A is configured to perform operation 10.

An example of the mobility procedure described in operation 10 is provided in FIG. 2, step S1. According to some of the example embodiments, the mobility procedure may be a TAU, a RAU or a handover. According to some of the example embodiments the identification of the wireless device or mobility management node currently serving the wireless device may be a GUTI or a P-TMSI. It should be appreciated that the node currently serving the wireless device is the mobility management node which serves the wireless device prior to the execution of the requested mobility procedure.

It should further be appreciated that a stateless mobility management node according to embodiments of the present solution is a node which utilizes a common external database shared by two or more stateless mobility management nodes for storing wireless device context information for wireless devices served by the mobility management nodes. The stateless mobility management node may be a SGSN, a S4-SGSN or a MME, or an associated function therein.

Operation 12

The stateless mobility management node is further configured to access 12, based on the identification, a common external database comprising stored context information for a plurality of wireless devices. The accessing module 12A is configured to perform operation 12.

An example of the common external database is provided in FIG. 1, database 124. Such a database may be used by any of a plurality of stateless mobility management node in the network. An example of the accessing operation is provided in FIG. 2, step S2.

Example Operation 14

According to some of the example embodiments, the accessing 12 further comprises locating the stored context information within the external database. Example operation 14 is described in at least FIG. 2, step S3. In such an instance, the wireless device is currently served by another stateless mobility management node, for example, prior to the execution of the requested mobility procedure. The stateless mobility management node currently serving the wireless device would have provided the wireless device context information within the external database 124.

Example Operation 16

According to some of the example embodiments, the accessing 12 further comprises determining 16 that context information is not stored within the external database with respect to the identification included in the mobility request received in operation 10.

Example operation 16 is described in at least FIG. 2, steps S5-S9. In such an instance, the mobility management node currently serving the wireless device, prior to the execution of the requested mobility procedure, is a legacy or stateful mobility management node.

Operation 18

The stateless mobility management node is further configured to determine 18 current context information based on the availability of stored context information within the common external database and/or stored context information itself for the wireless device. The determining module 18A is configured to perform operation 18.

According to some of the example embodiments, the determining may be retrieving the context information from the common external database, as described in FIG. 2, step S4, or receiving the context information from a mobility management node currently serving the wireless device, as described in FIG. 2, steps S5-S7.

Example Operation 20

According to some of the example embodiments, in the case in which the context information was located within the common external database (as described in example operation 14), the determining 18 further comprises receiving 20 the stored context information from the external database. The stored context information is set as the current context information.

Example operation 20 is further described in at least FIG. 2, steps S3-S4. In this instance, the node currently serving the wireless device is also a stateless mobility management node. Thus, the context information located within the external database is accurate and may be used in the execution of the mobility procedure.

Example Operation 24

According to some of the example embodiments, in the case in which the context information was not located within the common external database (as described in example operation 16), the determining 18 further comprises retrieving 24 current context information from an old legacy mobility management node, which is also the mobility management node currently serving the wireless device prior to the execution of the requested mobility procedure. The current context information comprises a second identification of the wireless device. According to some of the example embodiments, the second identification of the wireless device may be an IMSI.

Example operation 24 is further described in at least FIG. 2, steps S5-S8. In such an instance, the stateless wireless device will send a request to the mobility management node currently serving the wireless device which will be a legacy stateful mobility management node. Thereafter, the stateless mobility management node receives the current context from the stateful mobility management node Example Operation 26

According to some of the example embodiments, upon the retrieving 24, the stateless mobility management node may be further configured to access 26, based on the second identification of the wireless device, the common external database for stored context information for the wireless device. Example operation 26 is further described in at least FIG. 2, steps S8 and S9.

Operation 28

The stateless mobility management node is further configured to perform 28 the requested mobility procedure using the current context information. The performing module 28A is configured to perform operation 28. Operation 28 is further explained in at least FIG. 2, steps S4, S11 and/or S12.

Operation 30

The stateless mobility management node is also configured to manage 30 the external database such that the external database comprises updated current context information. The updated current context information comprises information related to the wireless device upon a completion of the mobility procedure. The managing module 30A is configured to perform operation 30.

Example Operation 32

According to some of the example embodiments, if the stored context information is found in the external database (as a result from the access described in operation 12 or the second access described in example operation 26), the managing 30 further comprises updating 32 the current context information upon performing the requested mobility procedure. Example operation 32 is further described in at least FIG. 2, steps S4 or S12. Such updating may include the stateless mobility management node including information that it is now currently serving the wireless device.

Example Operation 34

According to some of the example embodiments, upon the updating 32, the stateless mobility management node is further configured to overwrite 38 the stored context information within the common external database with the updated current context information based on the identification or the second identification. Example operation 34 is further described in at least FIG. 2, steps S4 or S12.

Example Operation 36

According to some of the example embodiments, if the stored context information is not found in the common external database (as a result form the second access described in example operation 26), the managing 30 further comprises updating 36 the current context information upon performing the requested mobility procedure. Such updating may include the stateless mobility management node including information that it is now currently serving the wireless device. Example operation 36 may be the same or similar as sample operation 32. Example operation 36 is further described in at least FIG. 2, step S11.

Example Operation 38

According to some of the example embodiments, upon the updating 36, the stateless mobility management node may be further configured to save 38 the updated current context information as stored context information based on the identification or the second identification. Example operation 38 is further described in at least FIG. 2, step S11.

Some embodiments described above may be summarized in the following manner:

One embodiment is directed to a stateless mobility management node for handling a mobility procedure for a wireless device within a wireless communications network, the stateless mobility management node comprising a processor and a memory, said memory comprising instructions executable by said processor whereby said stateless mobility management node is operative to:

receive, from the wireless device, a request for the mobility procedure, the request comprising an identification identifying at least one of the wireless device or a mobility management node currently serving the wireless device;

access, based on the identification, a common external database shared by the stateless mobility management node and at least one other stateless mobility management node, and comprising stored context information for a plurality of wireless devices served by the stateless mobility management nodes;

determine current context information based on the an availability of stored context information for the wireless device and/or the stored context information itself for the wireless device;

perform the requested mobility procedure using current context information; and manage the common external database such that the external database comprises updated current context information, wherein the updated current context information comprises information related to the wireless device upon a completion of the mobility procedure.

The identification may be a Globally Unique Temporary Identity, GUTI, or a Packet Temporary Mobile Subscriber Identity, P-TMSI.

The access of the common external database may further comprise the stateless mobility management node being operative to locate the stored context information within the external database; and the determine current context information may further comprise the stateless mobility management node being operative to retrieve the stored context information from the external database, wherein the stored context information is set as the current context information; and the manage the external database may further comprise the stateless mobility management node being operative to update the current context information and overwrite the stored context information with the updated current context information within the external database.

The access of the common external database may further comprise the stateless mobility management node being further operative to determine that context information is not stored within the external database with respect to the identification; and the determine current context information may further comprise the stateless mobility management node being further operative to retrieve, from a mobility management node currently serving the wireless device, current context information, the current context information comprising a second identification of the wireless device; and the determine current context information may further comprise the stateless mobility management node also being operative to access, based on the second identification of the wireless, the external database for stored context information for the wireless device.

If the context information is located in the common external database, then the management of the external database may further comprise:

upon performing the requested mobility procedure, update the current context information; and overwrite the stored context information within the external database with the updated current context information.

If the stored context information is not found in the common external database, then the management of the external database may further comprise:

upon performing the requested mobility procedure, update the current context information; and save the updated current context information as stored context information based on the identification or the second identification.

The second identification may be an International Mobile Subscriber Identity, IMSI.

The stateless mobility management node may be a Serving General Packet Radio Service Support Node, SGSN, a S4-SGSN or a Mobility Management Entity, MME.

Some other embodiments described above may be summarized in the following manner:

Another embodiment is directed to a method, in a stateless mobility management node, for handling a mobility procedure for a wireless device within a wireless communications network, the method comprising:

receiving, from the wireless device, a request for the mobility procedure, the request comprising an identification identifying at least one of the wireless device or a mobility management node currently serving the wireless device;

accessing, based on the identification, a common external database shared by the stateless mobility management node and at least one other stateless mobility management node, and comprising stored context information for a plurality of wireless devices served by the stateless mobility management nodes;

determining current context information based on the an availability of stored context information for the wireless device and/or the stored context information itself for the wireless device;

performing the requested mobility procedure using current context information; and managing the common external database such that the external database comprises updated current context information, wherein the updated current context information comprises information related to the wireless device upon a completion of the mobility procedure.

The method identification may be a Globally Unique Temporary Identity, GUTI, or a Packet Temporary Mobile Subscriber Identity, P-TMSI.

The accessing of the common external database may further comprise locating the stored context information within the external database; and the determining may further comprise retrieving the stored context information from the external database, wherein the stored context information is current context information; and the managing may further comprise updating the current context information and overwriting the stored context information with the updated current context information within the external database.

The accessing of the common external database may further comprise determining that context information is not stored within the external database with respect to the identification; and the determining may further comprise retrieving, from a mobility management node currently serving the wireless device, current context information, the current context information comprising a second identification of the wireless device; and the determining may also comprise accessing, based on the second identification of the wireless, the external database for stored context information for the wireless device.

If the context information is located in the common external database, then the managing may further comprise:

upon performing the requested mobility procedure, updating the current context information; and overwriting the stored context information within the external database with the updated current context information.

If the stored context information is not found in the common external database, then the managing of the external database may further comprise:

upon performing the requested mobility procedure, updating the current context information; and saving the updated current context information as stored context information based on the identification or the second identification.

The second identification may be an International Mobile Subscriber Identity, IMSI.

The stateless mobility management node may be a Serving General Packet Radio Service Support Node, SGSN, a S4-SGSN or a Mobility Management Entity, MME.

It should be noted that although terminology from 3GPP LTE has been used herein to explain the example embodiments, this should not be seen as limiting the scope of the example embodiments to only the aforementioned system. Other wireless systems, including WCDMA, WiMax, UMB, WiFi and GSM, may also benefit from the example embodiments disclosed herein.

The description of the example embodiments provided herein have been presented for purposes of illustration. The description is not intended to be exhaustive or to limit example embodiments to the precise form disclosed, and modifications and variations are possible in light of the above teachings or may be acquired from practice of various alternatives to the provided embodiments. The examples discussed herein were chosen and described in order to explain the principles and the nature of various example embodiments and its practical application to enable one skilled in the art to utilize the example embodiments in various manners and with various modifications as are suited to the particular use contemplated. The features of the embodiments described herein may be combined in all possible combinations of methods, apparatus, modules, systems, and computer program products. It should be appreciated that the example embodiments presented herein may be practiced in any combination with each other.

It should be noted that the word "comprising" does not necessarily exclude the presence of other elements or steps than those listed and the words "a" or "an" preceding an element do not exclude the presence of a plurality of such elements. It should further be noted that any reference signs do not limit the scope of the claims, that the example embodiments may be implemented at least in part by means of both hardware and software, and that several "means", "units" or "devices" may be represented by the same item of hardware.

Also note that terminology such as user equipment should be considered as non-limiting. A device or user equipment as the term is used herein, is to be broadly interpreted to include a radiotelephone having ability for Internet/intranet access, web browser, organizer, calendar, a camera (e.g., video and/or still image camera), a sound recorder (e.g., a microphone), and/or global positioning system (GPS) receiver; a personal communications system (PCS) user equipment that may combine a cellular radiotelephone with data processing; a personal digital assistant (PDA) that can include a radiotelephone or wireless communication system; a laptop; a camera (e.g., video and/or still image camera) having communication ability; and any other computation or communication device capable of transceiving, such as a personal computer, a home entertainment system, a television, etc. It should be appreciated that the term user equipment may also comprise any number of connected devices. Furthermore, it should be appreciated that the term 'user equipment' shall be interpreted as defining any device which may have an internet or network access. Furthermore, it should be appreciated that the term M2M device shall be interpreted as a sub-class of user equipments which engage in infrequent communications.

The various example embodiments described herein are described in the general context of method steps or processes, which may be implemented in one aspect by a computer program product, embodied in a computer-readable medium, including computer-executable instructions, such as program code, executed by computers in networked environments. A computer-readable medium may include removable and non-removable storage devices including, but not limited to, Read Only Memory (ROM), Random Access Memory (RAM), compact discs (CDs), digital versatile discs (DVD), etc. Generally, program modules may include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps or processes.

In the drawings and specification, there have been disclosed exemplary embodiments. However, many variations and modifications can be made to these embodiments. Accordingly, although specific terms are employed, they are used in a generic and descriptive sense only and not for purposes of limitation, the scope of the embodiments being defined by the following claims.

The invention claimed is:

1. A stateless mobility management node for handling a mobility procedure for a wireless device within a wireless communications network, the stateless mobility management node comprising a processor and a memory, said memory comprising instructions executable by said processor whereby said stateless mobility management node is operative to:
receive, from the wireless device, a request for the mobility procedure, the request comprising an identification identifying at least one of the wireless device or a mobility management node currently serving the wireless device;
access, based on the identification, a common external database shared by the stateless mobility management node and at least one other stateless mobility management node, and comprising stored context information for a plurality of wireless devices served by the stateless mobility management node and the at least one other stateless mobility management node;
determine current context information based on an availability of stored context information for the wireless device and/or the stored context information itself for the wireless device;
perform the requested mobility procedure using the current context information; and
manage the common external database such that the common external database comprises updated current context information, wherein the updated current context information comprises information related to the wireless device upon a completion of the mobility procedure
wherein:
accessing the common external database further comprises the stateless mobility management node being further operative to determine that context information is not stored within the common external database with respect to the identification;
determining the current context information further comprises the stateless mobility management node being further operative to retrieve, from the mobility management node currently serving the wireless device, the current context information, the current context information comprising a second identification of the wireless device; and
determining the current context information further comprises the stateless mobility management node also being operative to access, based on the second identification of the wireless device, the common external database for the stored context information for the wireless device.

2. The stateless mobility management node of claim 1, wherein the identification is a Globally Unique Temporary Identity, GUTI, or a Packet Temporary Mobile Subscriber Identity, P-TMSI.

3. The stateless mobility management node of claim 1, wherein
the access of the common external database further comprises the stateless mobility management node being operative to locate the stored context information for the wireless device within the common external database;
the determine the current context information further comprises the stateless mobility management node being operative to retrieve the stored context information for the wireless device from the common external database, wherein the stored context information for the wireless device is set as the current context information; and the manage the common external database further comprises the stateless mobility management node being operative to update the current context information and overwrite the stored context information for the wireless device with the updated current context information within the common external database.

4. The stateless mobility management node of claim 1, wherein if the stored context information for the wireless device is located in the common external database, manage the common external database further comprises:
    upon performing the requested mobility procedure, update the current context information; and
    overwrite the stored context information for the wireless device within the common external database with the updated current context information.

5. The stateless mobility management node of claim 1, wherein if the stored context information for the wireless device is not found in the common external database, manage the common external database further comprises:
    upon performing the requested mobility procedure, update the current context information; and
    save the updated current context information as the stored context information for the wireless device based on the identification or the second identification.

6. The stateless mobility management node of claim 1, wherein the second identification is an International Mobile Subscriber Identity, IMSI.

7. The stateless mobility management node of claim 1, wherein the stateless mobility management node is a Serving General Packet Radio Service Support Node, SGSN, a S4-SGSN or a Mobility Management Entity, MME.

8. A method, in a stateless mobility management node, for handling a mobility procedure for a wireless device within a wireless communications network, the method comprising:
    receiving, from the wireless device, a request for the mobility procedure, the request comprising an identification identifying at least one of the wireless device or a mobility management node currently serving the wireless device;
    accessing, based on the identification, a common external database shared by the stateless mobility management node and at least one other stateless mobility management node, and comprising stored context information for a plurality of wireless devices served by the stateless mobility management node and the at least one other stateless mobility management node;
    determining current context information based on an availability of stored context information for the wireless device and/or the stored context information itself for the wireless device;
    performing the requested mobility procedure using the current context information; and
    managing the common external database such that the common external database comprises updated current context information, wherein the updated current context information comprises information related to the wireless device upon a completion of the mobility procedure,
wherein:
    accessing the common external database further comprises determining that context information is not stored within the common external database with respect to the identification;
    determining the current context information further comprises retrieving, from the mobility management node currently serving the wireless device, the current context information, the current context information comprising a second identification of the wireless device; and
    determining the current context information also comprises accessing, based on the second identification of the wireless device, the common external database for the stored context information for the wireless device.

9. The method of claim 8, wherein the identification is a Globally Unique Temporary Identity, GUTI, or a Packet Temporary Mobile Subscriber Identity, P-TMSI.

10. The method of claim 8, wherein
    accessing the common external database further comprises locating the stored context information for the wireless device within the common external database;
    determining the current context information further comprises retrieving the stored context information for the wireless device from the common external database, wherein the stored context information is the current context information; and
    managing the common external database further comprises updating the current context information and overwriting the stored context information for the wireless device with the updated current context information within the common external database.

11. The method of claim 8, wherein if the context information is located in the common external database, managing the common external database further comprises:
    upon performing the requested mobility procedure, updating the current context information; and
    overwriting the stored context information for the wireless device within the common external database with the updated current context information.

12. The method of claim 8, wherein if the stored context information for the wireless device is not found in the common external database, managing the common external database further comprises:
    upon performing the requested mobility procedure, updating the current context information; and
    saving the updated current context information as the stored context information for the wireless device based on the identification or the second identification.

13. The method of claim 8, wherein the second identification is an International Mobile Subscriber Identity, IMSI.

14. The method of claim 8, wherein the stateless mobility management node is a Serving General Packet Radio Service Support Node, SGSN, a S4-SGSN or a Mobility Management Entity, MME.

* * * * *

UNITED STATES PATENT AND TRADEMARK OFFICE
CERTIFICATE OF CORRECTION

PATENT NO. : 10,555,224 B2
APPLICATION NO. : 15/745229
DATED : February 4, 2020
INVENTOR(S) : Rydnell et al.

It is certified that error appears in the above-identified patent and that said Letters Patent is hereby corrected as shown below:

In the Specification

In Column 3, Line 26, delete "the an" and insert -- the --, therefor.

In Column 4, Line 41, delete "is flow" and insert -- is a flow --, therefor.

In Columns 7 & 8, in Table, Line 33, Under "Description" delete "fo the visitng" and insert -- for the visiting --, therefor.

In Column 18, Line 43, delete "the an" and insert -- the --, therefor.

In Column 19, Line 57, delete "the an" and insert -- the --, therefor.

In the Claims

In Column 22, Line 33, in Claim 1, delete "procedure" and insert -- procedure, --, therefor.

Signed and Sealed this
Eighteenth Day of August, 2020

Andrei Iancu
*Director of the United States Patent and Trademark Office*